(12) United States Patent
Gruhl et al.

(10) Patent No.: US 7,480,243 B2
(45) Date of Patent: Jan. 20, 2009

(54) PACKET ORDERING METHOD AND APPARATUS IN A MOBILE COMMUNICATION NETWORK EMPLOYING HIERARCHICAL ROUTING WITH DATA PACKET FORWARDING

(75) Inventors: Stefan Gruhl, Nuremberg (DE); Jens Mueckenheim, Nuremberg (DE)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1254 days.

(21) Appl. No.: 10/620,894

(22) Filed: Jul. 16, 2003

(65) Prior Publication Data

US 2004/0131040 A1    Jul. 8, 2004

(30) Foreign Application Priority Data

Jul. 16, 2002    (EP) .................................. 02254975

(51) Int. Cl.
*H04J 1/16*    (2006.01)
*H04L 12/28*    (2006.01)

(52) U.S. Cl. ........................................ 370/235; 370/394
(58) Field of Classification Search ........................ None
See application file for complete search history.

(56) References Cited

U.S. PATENT DOCUMENTS

| | | | | |
|---|---|---|---|---|
| 6,754,495 | B2 * | 6/2004 | Kusaki et al. | 455/436 |
| 6,920,152 | B1 * | 7/2005 | Chang et al. | 370/474 |
| 6,985,463 | B1 * | 1/2006 | Wright et al. | 370/331 |
| 7,155,518 | B2 * | 12/2006 | Forslow | 709/227 |

FOREIGN PATENT DOCUMENTS

| | | |
|---|---|---|
| EP | 1 085 779 A1 | 3/2001 |
| WO | WO 98/47302 A | 10/1998 |

OTHER PUBLICATIONS

Dongwook Lee et al: "Out of Sequence Packet Analysis in Mobile IP Handoff and its Enhancement", Proceedings of the 3GWireless 2002, Online! May 2002, XP002225432 Retrieved from the Internet: URL:http://netmedia.kjist.ac.kr/jongwon/papers/20023gwireless-mobileip.pdf retrieved on Dec. 16, 2002.

Ananoglu, E. et al: "AIRMAIL: A Link-Layer Protocol for Wireless Networks" Wireless Networks, ACM, U.S., vol. 1, No. 1, Feb. 1, 1995, pp. 47-59, XP000503720 ISSN: 1022-0038.

* cited by examiner

*Primary Examiner*—Andrew Lee

(57) ABSTRACT

The present invention, in particular, refers to is a data packet ordering method in a mobile communication network employing hierarchical routing with data packet forwarding comprising the step of providing at least one data message encompassing a predefined sequence of data packets, forwarding at least one of said data packets of the sequence via a first network element over a first transmission path to a user equipment, whereby a part of the data packets are temporarily buffered in the first network element during transmission, establishing a second transmission path, while forwarding the data packet sequence, such that the remaining data packets of the sequence not yet transmitted over the first path are forwarded via a second network element, forwarding of the data packets buffered in the first network element to the second network element for providing all data packets comprised by the data packet sequence to the user equipment, receiving and ordering of the data packets within said second network element according to the packet data priority given by the data packet sequence, forwarding the ordered data packets to the user equipment.

7 Claims, 3 Drawing Sheets

PACKET ORDERING METHOD AND APPARATUS IN A MOBILE COMMUNICATION NETWORK EMPLOYING HIERARCHICAL ROUTING WITH DATA PACKET FORWARDING

CROSS REFERENCE TO RELATED APPLICATION

This application claims priority of European Application No. 02254975.2 filed on Jul. 16, 2002.

FIELD OF THE INVENTION

The invention relates to a data, and to an apparatus or a mobile communication system, and a computer program for carrying out the method.

DESCRIPTION OF RELATED ART

In wireless data packet switched networks, and especially in code divisional multiple access systems (CDMA) like the universal mobile telecommunication system (UMTS) or the time division multiple access system (TDMA) like general packet radio systems (GPRS) hierarchical routing is used for mobility support.

In case of packet switch exchange, in the connectionless mode of a telecommunication systems, the packet data are queued and generally buffered, respectively, in a distributed manner at the respective route network subsystem (RNS) and in the backbone network, e.g. in the serving radio network subsystem (SGSN). The distribution of the data is out of control and defined by flow control mechanisms, which are subject to individual parameter settings.

FIG. 1 shows an example of an UMTS terrestrial network in the packet switched domain with inter-RNS/intra-SGSN hand-off or hand-over. One SGSN, which is somehow connected to other SGSN or to a other gateway GPRS supporting node (GGSN), is connected to two RNS#1 and #2 and to the dedicated BTS (base transceiver station or nodeB) respectively. In case of GPRS RNS has to be replaced by a base-station subsystem (BSS) with similar functionality. The mobile station (MS) is assumed currently connected to RNS#1. This connection is denoted by 1. When the MS moves from RNS#1 towards RNS#2 an inter-RNS/intra-SGSN handover occurs, where in the final stage the MS is connected to RNS#2. This connection is denoted by 2.

In the case depicted in FIG. 1, it is assumed that flow control has data buffered in both element levels, i.e. in RNS#1 as well as in SGSN. Flow control parameters dictate the distribution of the packet data between network elements.

During hand-over, the mobility support at node SGSN results in a new packet path to RNS#2. Given that packet forwarding is activated, i.e. RNS#1 forwards the buffered packets to the new destination, this will lead to two different packet paths to the target RNS#2. Dropping the buffered packets at RNS#1 is not an option for reliability performance. Therefore, packets may become reordered at the new target RNS#2, which contains the buffer of the bottleneck air-link. Then, Without reordering, the MS receives out of sequence packets after hand-over.

In this case the transmission control protocol (TCP) receiver in the MS will "slowly" receive some packets, and request erroneously TCP retransmissions resulting in spurious retransmission, which erodes the transmission control protocol (TCP) throughput and wastes system resources. Due to the higher network delays this becomes more critical for inter-RNS/inter-SGSN hand-overs where more than one SGSN is involved.

In UMTS this problem could be partly solved using the loss-less serving radio network subsystem (SRNS) relocation procedure as specified in the current third generation partnership project (3GPP) UMTS standards. Because this procedure works on the radio link control (RLC) layer tight requirements on timing, buffering, etc. must be fulfilled to fully avoid packet reordering. However to significantly relax these requirements a method would be necessary that handles packet reordering on a higher layer than RLC. In GPRS there is no such procedure defined in the standards. Here, a method is necessary to handle the reordering effects in general.

In response to the concerns discussed above it is the object of the present invention to provide especially a method and an apparatus which allows reordering on a higher layer than radio link control layer in a wireless data packet switched network.

SUMMARY OF THE INVENTION

The inventive solution is obtained by a data packet ordering method according to claim 1, by an apparatus and/or a mobile communication system according to claim 9, and by a computer program defined in claim 10

Preferred and/or advantageous embodiments or refinements are subject of the respective dependent claims.

The present invention, in particular, refers to a data packet ordering method in a mobile communication network employing hierarchical routing with data packet forwarding comprising the step of providing at least one data message encompassing a predefined sequence of data packets, forwarding at least one of said data packets of the sequence via a first network element over a first transmission path to a user equipment, whereby a part of the data packets are temporarily buffered in the first network element during transmission, establishing a second transmission path, while forwarding the data packet sequence, such that the remaining data packets of the sequence not yet transmitted over the first path are forwarded via a second network element, forwarding of the data packets buffered in the first network element to the second network element for providing all data packets comprised by the data packet sequence to the user equipment, receiving and ordering of the data packets within said second network element according to the packet data priority given by the data packet sequence, forwarding the ordered data packets to the user equipment.

Highly advantageous, the inventive method, particularly in case of handover, allows a significant enhancement of the packet data performance by mitigating the impact of TCP congestion control effects, which would normally occur due to loss of packet order during handoff between different network elements. Because the inventive method solves the problem of packet reordering on a higher layer, the requirements on loss-less SRNS relocation, which works on the RLC layer, can be significantly relaxed.

According to a further advantageous refinement of the inventive method, the data packets received by the second network element are assigned to separated data queues in the second network element depending on their priority in the data packet sequence. Thus, a preselection of data packets received is achieved, on which basis the ordering or reordering process can be completed.

In this regard, the assignment is established and/or the priority is evaluated on the basis of a preset data packet identifier. The packet identifier parameter is preset to identify data packets of different and destination address and port address within the second network element. Thus far, the identifier advantageously makes use, as appropriate, of both parameters being known of the data packets due to the standardized or at least quasi standardized nature of the transmission protocols applied in the state of the art communication systems and parameters being defined on the basis of the inventive method. In a preferred embodiment for example a priority indicator or priority identifier is defined characterizing those data packets from those network elements and/or received over those paths having higher priority to be sent to a mobile station or user equipment than others.

The latter identifier parameter, particularly can be used in an additional further development of the invention, wherein the data packets received by the second network element over the second path or over a third path via the first network element or over other paths via other network elements are buffered in separated data queues depending on which path and/or from which network elements the data packets are forwarded to the second network element.

Advantageously, for forwarding the data packets of each data queue, the data packets received by each data queue are worked through in a first-in, first-out manner, and the data queues themselves are worked through in an order depending on the priority of the data packets, which for instance can be determined on the basis of the priority indicator mentioned above, with regard to the data packet sequence comprised by the respective data queue.

According to a further embodiment of the invention the ordering step comprises the sub-step assigning a received data packet to a data queue on the basis of corresponding data packet identifier information, and sequential ordering of the received data packets by applying data packet identifier information.

With regard to the foregoing aspect of the invention, the assignment of the received data packets is performed by generating and/or identifying a data queue on the basis of the source address, the destination address and the port address of the received data packet being encompassed by the inventive identifier, and wherein the sequential ordering is carried out on the basis of priority sequence number.

BRIEF DESCRIPTION OF THE DRAWING

The invention together with additional features and advantageous thereof will be best understood from the following description.

It is shown.

DETAILED DESCRIPTION OF THE INVENTION

First Preferred Embodiment

Figure 1:
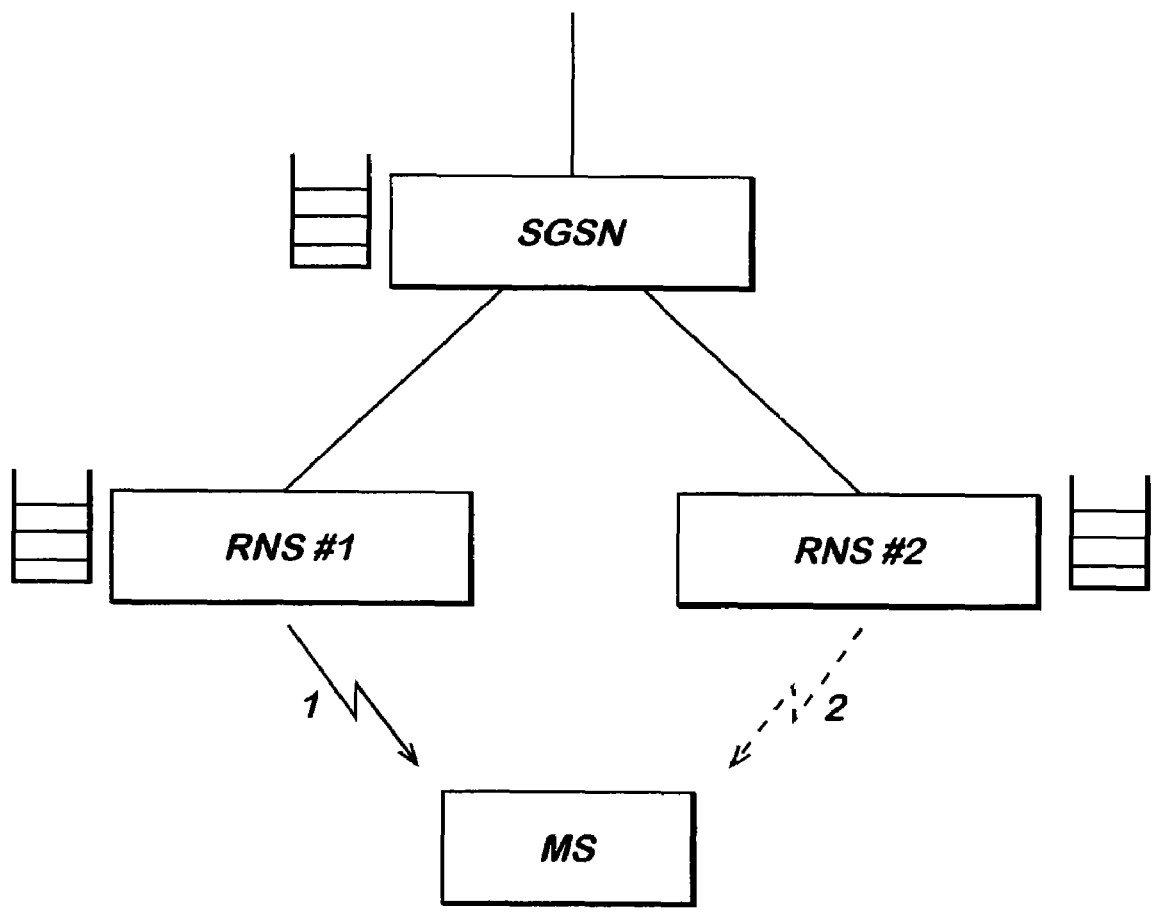
FIG. 1 a diagrammatic view of a UMTS terrestrial network in case of inter-RNS/intra-SGSN hand-over.

Starting from the situation described in connection with FIG. 1 at the beginning, the basic principle of the first embodiment of the invention relies on a generation of at least two priority queues being built per mobile station (MS) (FIG. 1) at the new destination network element (RNS#2), the mobile station will be connected to. Of course, it will be obvious for any person skilled in the art that the RNS#2 can be replaced by a radio network controller (RNC) or an equivalent network element. Moreover, at this point it should be noted that by the term "packet forwarding" in the context of the invention it is meant that when centralized mobility related rerouting action is performed, the previous destination network element forwards the packets to the new destination network element.

The first packets, which have not been sent to the mobile station so far due to hand-over, come from the old network element (RNS#1). To preserve the packet order, those first packets shall be prioritized. When no more packets are received from the old network (RNS#1) element, then it shall be continued with serving the second level priority queue, which holds for instance the internet protocol (IP) packets forwarded from the network element next higher in the routing hierarchy (SGSN or equivalent). This network element has already started rerouting of the new packets towards the new lower level network element.

Further more, especially with regard to the first embodiment of the invention, some further assumptions have to be made. First of all it is assumed that the used TCP (transmission control protocol) is able to accept one single reordering without problem. This applies to the majority of TCP implementations currently deployed. Furthermore, the forwarding paths in the terrestrial Network are fast, i.e. forwarding from both buffers of at least the first IP packet is faster than the transmission of any IP packet over a new radio link. Finally, it is assumed that the higher level network element forwards all stored and newly incoming packets in a FIFO (first in, first out) manner to the new lower level network element, i.e. firstly stored packets, secondly new arriving packets.

Figure 2:
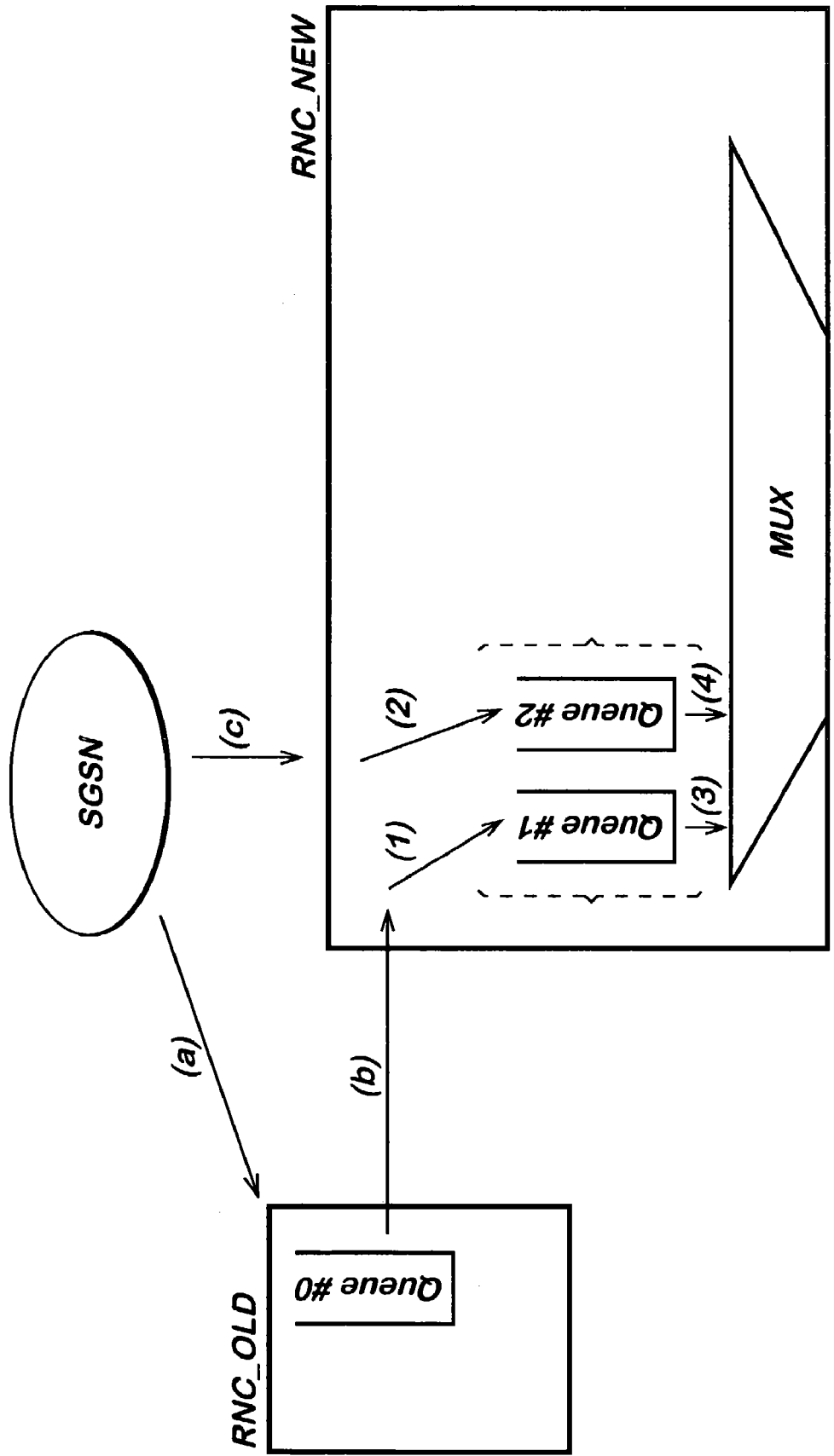
FIG. 2 an UMTS, SRNS relocation scenario.

FIG. 2 depicts a typical networking scenario for an intra-service GPRS supporting node (intra-SGSN) and an inter-radio network controller (inter-RNC), respectively, handoff, i.e. a serving radio subsystem (SRNS) relocation. The same scenario is applicable for inter-SGSN handoffs in the same system from a GGSN perspective or inter-system handoff, e.g. between UMTS and GPRS. FIG. 2 describes two paths, where (a) was the old path to the previous radio network controller (RNC_OLD). All packets associated to the same mobile station (MS) are previously buffered in queue #0. When hand-over occurs, the central routing device (SGSN) from now on forwards the packets for the mobile station that is in hand-off via path (c) to the new destination radio network controller (RNC_NEW). At about the same time the old destination RNC_OLD forwards the remaining, packets that have not yet been sent out to the mobile station (MS), from its local queue to the new RNC_NEW via path (b). Arrived packets for the same mobile station at the new destination RNC_NEW can be distinguished based on their source and identified to path (b) and path (c) respectively.

The inventive method utilizes the path information to queue the packets in RNC_NEW separately. Queue #1 contains all packets arriving from path (b) that carries the previously buffered data of the old queue #0 from RNC_OLD marked by (1). Queue #2 contains the packets received from path (c) that carries the newly packets from SGSN marked by (2).

Both queues work in a first in, first out (FIFO) manner, i.e. the firstly received packets will be also sent first. Therefore, no further treatment of the packets and particularly no active reordering procedures is necessary in these queues. The service discipline in the new destination RNC_NEW for multiplexing these two queues is strictly priority based scheduling: Whenever the mobile station gets serviced, queue #1 gets priority resulting in queue access (3), over queue #2. Access (4) to queue #2 only occurs when queue #1 is empty.

Thus, the allocation of the received data packets into queue #1 or queue #2 can be done by the following two ways:

a) The packets are directly identified by detection of the source from which they has been routed to RNC_NEW. The packets from RNC_OLD associated to path (b) are put into queue #1. The packets from SGSN associated to path (c) are put into queue #2.
b) The packets are identified by utilizing a priority indicator that is set in RNC_OLD. The packets from path (c) with higher priority indicated are put into queue #1. The packets from path (c) with lower priority indicated are put into queue #2.

This strategy heuristically ensures the priority of data path (a) and (b) over data path (c) reducing the negative impact on TCP performance due to IP reordering The basic principle described above can be enhanced to more than two queues. For example, for inter-SGSN/inter-RNC hand-off it might be sensible to use three different queues, because there are now three separate network elements involved. In this scenario the allocation of the queues in the new RNC could be as follows:

a) Queue #1 contains the packets, which have been received from the old RNC. They get the highest priority.
b) Queue #2 contains the packets, which have been received from the old SGSN. They get the second highest priority.
c) Queue #3 contains the packets, which have been received from the new SGSN. They get the lowest priority.

Second Preferred Embodiment

Figure 3:
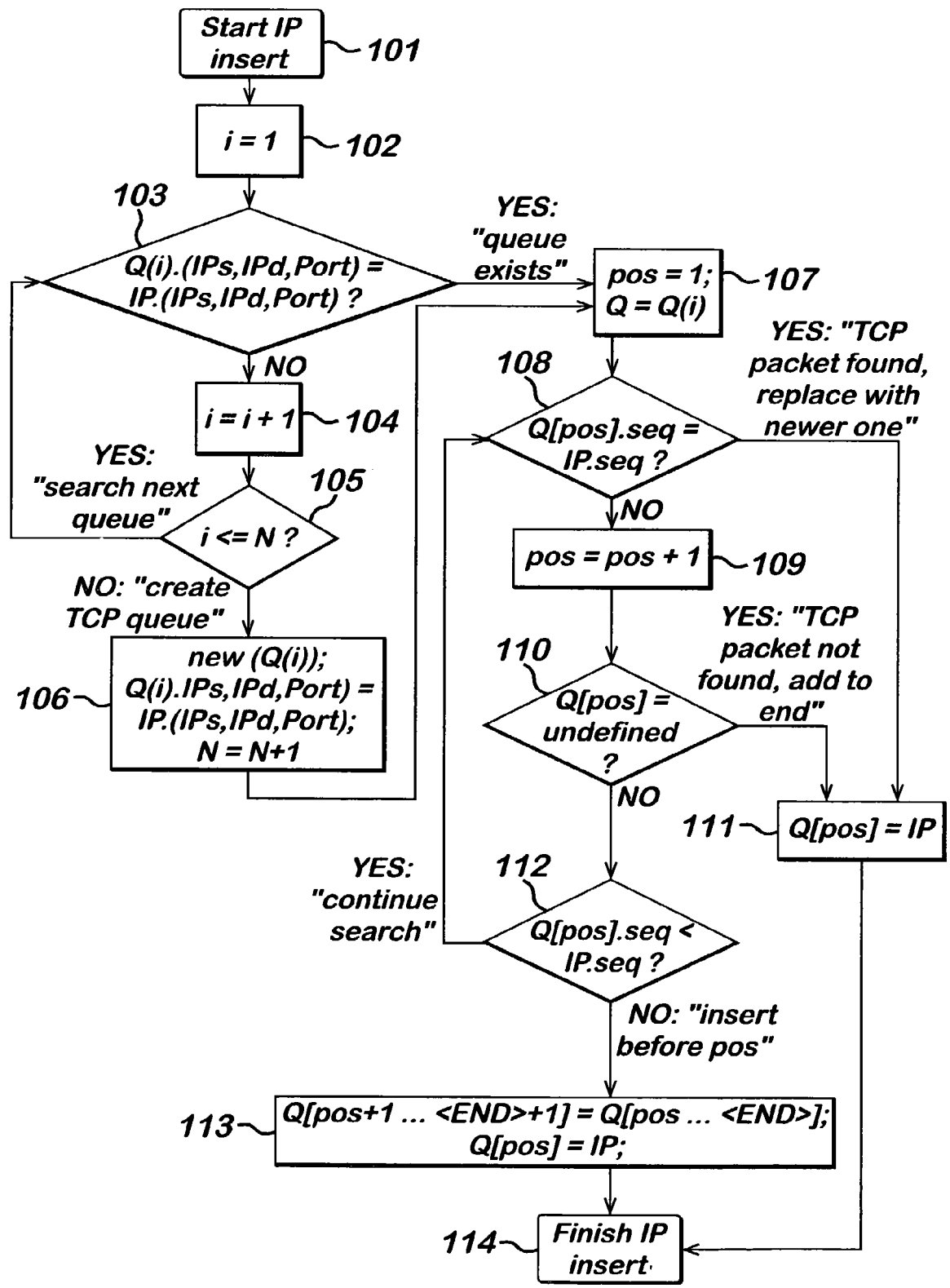
FIG. 3 a flow chart of a ordering functionality according to a preferred embodiment of the invention.

In the flow chart according to FIG. 3 an exemplary reordering algorithm following preferred embodiment #2 is depicted. By example, the inventive method is also described on an internet based data transmission. So far, a direct mapping between the received transmission control protocol (TCP) packet and the associated internet protocol (IP) packet is assumed, i.e. no further segmentation has been performed, and if so the IP packets are assumed firstly reassembled at some instance within the core network, before entering the mobility supporting routing system and then they are processed as described hereinafter. It shall be noted this requires the identification of TCP-entities, which is possible due to the de-facto standardized nature of the TCP format. Based on this, the TGP sequence field can be accessed by the inventive method or algorithm.

The algorithm is performed in the new RNC for every received TCP packet irrespective if it is from the old RNC or the new RNC. The single steps in detail are as follows:

101. The IP insert procedure is started on the reception of a TCP packet from the old RNC or from the SGSN.
102. Initialize counter i to search all queues associated with the MS. A separate queue for each TCP data flow is assumed.
103. Identify the right queue Q(i), based on source IP address IPs, destination IP address IPd and port identification number Port, which gets stored as a triple together with each queue.
   If the queue Q(i) is associated to the incoming TCP packet, then the queue exists. Proceed with step 107.
   If the queue Q(i) is not associated to the incoming TCP packet, then proceed with step
104. Increment counter i.
105. Check whether a new queue must be created by comparing counter i with the total queue counter N. If i<=N, then search the next existing queue. Go back to step 103. If i>N, then create a new queue. Proceed with step 106.
106. Create a new queue Q(i). Store the triple Q(i).(IPs, IPd, Port) from the incoming TCP packet for identification and increment the total queue counter N. Proceed with step 107.
107. Initialize the position counter pos. Take queue Q=Q(i).
108. Check if the incoming TCP packet already exists at position pos by comparing the queued TCP sequence number of the currently handled buffered TCP packet at position pos Q[pos] with the TCP sequence number of the arrived TCP packet.
   If the sequence number at pos is equal to the sequence number of the arrived TCP packet, then replace the buffered TCP packet with the newer one. Go to step 111.
   If the sequence number at pos is unequal to the sequence number of the arrived TCP packet, then the packet does not exist. Proceed with step 109.
109. Increment the position counter pos.
110. Check if end of queue is reached, i.e. if Q[pos] is undefined.
   If Q[pos] is undefined, then add it to the end. Proceed with step 111.
   If Q[pos] is defined, then go to step 112.
111. Insert the incoming TCP packet at pos. Go to step 114 (finish).
112. Cheek whether the arrived TCP packet must be inserted before pos in the queue Q by comparing the queued TCP sequence number of the currently handled buffered TCP packet at position pos Q[pos] with the TCP sequence number of the arrived TCP packet. If the sequence number at pos is smaller than the sequence number of the arrived TCP packet, then continue the search. Go back to step 108. If the sequence number at pos is equal or higher than the sequence number of the arrived TCP packet, then insert the TCP packet before pos.
113. Insert the incoming TCP packet before pos. Go to step 114 (finish).
114. The IP insert algorithm is finished for the moment. It will be wait until the next TCP packet arrives.

Legend for FIG. 3:
Q a packet data queue, FIFO served, where
Q(i) denotes a queue with index i, and 1<=i<=N, where is the total
N number of queues maintained per MS (total queue counter). It is equal to the number of simultaneously established TCP data flows.
   Every queue is labeled by a triple Q(i).(IPs,IPd,Port) with IP source address,
   IP destination address.
Ips Port number.
IPd denotes the buffered content at Q(i) buffer position m, where m−1
Port denotes the head of the queue and m=<END> the last position.
Q(i)[m] denotes a sequence of buffer positions in queue Q(i). retrieves the TCP sequence number field stored in each IP packet.
Q(i)[a . . . b]
Q(i)[m].seq.

It shall be noted that the deletion of queues is not separately described here and may e.g. be done when a queue becomes empty.

The proposed algorithm is activated on occurrence of a inter-RNC hand-off. It shall be de-activated a certain time-period after the activation. The duration of this time-period is target of optimization with the following constraints:

a) If time-period is too small, then after de-activation of the algorithm the packets from the old RNC are ignored. This may lead to a loss of those packets.
b) If time-period is too long the algorithm runs only on packets arriving from the SGSN, which does not need to be processed by the algorithm. This may lead to inefficient processing of the packets.

Similar to preferred embodiment #1 the same algorithm as described above can be also used in case of more than two different TCP packet routes. For example, during inter-SGSN/inter-RNC hand-off, three separate network elements are involved.

A reordering scheme as described above especially in connection with embodiment #2 is very robust for timing of packet arrivals at the destination node and it is also capable of resolving reordering from several distributed routing actions in sequence. Therefore, neither the number of forwarding routes nor the precise reasons for the reordering is important. Particularly the handling of sequential hand-off procedures for fast moving mobiles is easy, because buffered data is aggregated into a single queue at each hop and only the content of this single buffer is subject for forwarding.

We claim:

1. A data packet ordering method in a mobile communication network employing hierarchical routing with data packet forwarding comprising the following steps:
   a) providing at least one data flow comprising a predefined sequence of data packets,
   b) forwarding at least one of said data packets of the sequence via a first network element (RNC_OLD) over a first transmission path to a user equipment, whereby a part of the data packets are temporarily buffered in the first network element (RNC_OLD) during transmission,
   c) establishing a second transmission path, while forwarding the data packet sequence, such that the remaining data packets of the sequence not yet transmitted over the first path are forwarded via a second network (RNC_NEW) element,
   d) forwarding of the data packets buffered in the first network element (RNC_OLD) to the second network (RNC_NEW) element for providing all data packets comprised by the data packet sequence to the user equipment,
   e) receiving and ordering of the data packets within said second network element (RNC_NEW) according to the packet data priority given by the data packet sequence,
   f) forwarding the ordered data packets to the user equipment (UE);
   wherein in the ordering step, the data packets received by the second network element are assigned to separated data queues in the second network element depending on their priority in the data packet sequence.

2. The method according to claim 1, wherein the assignment is established and/or the priority is evaluated on the basis of a preset data packet identifier.

3. The method according to claim 2 wherein the data packet identifier is preset to identify the data packets of different origin and/or forwarding path and/or destination address and/or port address and/or priority sequence number within the second network element.

4. The method according to claims 1, wherein the data packets received by the second network element over the second path or over a third path via the first network element or over other paths via other network elements are buffered in separated data queues depending on which path and/or from which network elements the data packets are forwarded to the second network element.

5. The method according to claim 4, wherein, for forwarding the data packets of each data queue, the data packets received by each data queue are worked trough in a first-in, first-out manner, and the data queues themselves are worked through in an order depending on the priority of the data packets with regard to the data packet sequence comprised by the respective data queue.

6. The method according to claims 1, wherein the ordering step comprises the following sub-steps:
   (i) assigning a received data packet to a data queue on the basis of corresponding data packet identifier information,
   (ii) sequential ordering of the received data packets by applying data packet identifier information.

7. The method according to claim 6, wherein the assignment is performed by generating and/or identifying a data queue on the basis of the source address, the destination address and the port address of the received data packet and wherein the sequential ordering is carried out on the basis of priority sequence number.

* * * * *